(12) United States Patent
Thubert et al.

(10) Patent No.: US 11,218,284 B2
(45) Date of Patent: Jan. 4, 2022

(54) ALLOCATING A RESOURCE UNIT TO A STATION

(71) Applicant: Cisco Technology, Inc., San Jose, CA (US)

(72) Inventors: Pascal Thubert, Roquefort-les-Pins (FR); Jerome Henry, Pittsboro, NC (US); Patrick Michel Pierre Wetterwald, Mouans Sartoux (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 16/564,918

(22) Filed: Sep. 9, 2019

(65) Prior Publication Data

US 2021/0075580 A1    Mar. 11, 2021

(51) Int. Cl.
| | |
|---|---|
| H04L 12/26 | (2006.01) |
| H04L 5/00 | (2006.01) |
| H04W 16/10 | (2009.01) |
| H04W 72/04 | (2009.01) |
| H04W 72/08 | (2009.01) |

(52) U.S. Cl.
CPC .......... *H04L 5/0098* (2013.01); *H04L 5/0055* (2013.01); *H04W 16/10* (2013.01); *H04W 72/0453* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 9,788,327 B2 | 10/2017 | Song et al. | |
| 9,992,788 B2 | 6/2018 | Auer et al. | |
| 10,165,589 B2 | 12/2018 | Madan et al. | |
| 2008/0008206 A1 | 1/2008 | Cho et al. | |
| 2011/0317581 A1* | 12/2011 | Hoshino | H04B 7/0486 370/252 |

(Continued)

OTHER PUBLICATIONS

PCT Notification of Transmittal of the International Search Report and the Written Opinion of the International Searching Authority, or the Declaration; International Application No. PCT/US2020/049635; 13 pages; dated Nov. 13, 2020.

(Continued)

*Primary Examiner* — Kwang B Yao
*Assistant Examiner* — Juvena W Loo
(74) *Attorney, Agent, or Firm* — Baker Botts, LLP (57) ABSTRACT

In one embodiment, an access point is configured with a plurality of resource units (RUs). Each RU is configured to use a frequency range that differs from frequency ranges used by the other RUs. The access point receives first information indicating, for each RU, a first signal quality that the station associates with the respective RU. The access point receives second information indicating, for each RU, a second signal quality that the station associates with the respective RU. The access point further determines, based on at least the first information and the second information, a pattern indicating a recurring signal quality that the station associates with each RU. The access point uses the pattern to allocate one of the RUs for communicating with the station.

20 Claims, 5 Drawing Sheets

(56) References Cited

U.S. PATENT DOCUMENTS

| | | | |
|---|---|---|---|
| 2012/0170545 A1* | 7/2012 | Yamamoto | H04W 56/002 370/330 |
| 2013/0051359 A1* | 2/2013 | Skarby | H04W 72/1226 370/330 |
| 2014/0321374 A1* | 10/2014 | Kim | H04L 5/0073 370/329 |
| 2016/0205666 A1* | 7/2016 | Huschke | H04W 72/00 370/330 |
| 2016/0211955 A1 | 7/2016 | Wu | |
| 2017/0163446 A1 | 6/2017 | Li et al. | |
| 2017/0331605 A1* | 11/2017 | Shani | H04L 25/0206 |
| 2019/0215842 A1* | 7/2019 | Silverman | H04W 24/10 |
| 2020/0014576 A1* | 1/2020 | Cherian | H04L 1/0026 |
| 2020/0076519 A1* | 3/2020 | Asterjadhi | H04L 1/0027 |

OTHER PUBLICATIONS 802.15.1™ *IEEE Standard for Information Technology—Telecommunications and Information Exchange between Systems—Local and Metropolitan Area Networks—Specific Requirements, Part 15.1: Wirelss Medium Access Control and Physical Layer (PHY) Specifications for Wireless Personal Area Networks* (WPANs) (pp. 19-20, 29-32, 45-50, 55-75, 88-89, 107-118, 123-127, 160-167, 530-531).

IEEE P802.11ax™/D4.0, *Draft Standard for Information Technology—Telecommunications and Information Exchange between Systems Local and Metropolitan Area Networks—Specific Requirements*, © 2019 IEEE, Feb. 2019, cover page and pp. 356-366.

IEEE Std 802.15.4™—2015 (Revision of IEEE Std 802.15.4-2011), *IEEE Standard for Low-Rate Wireless Networks* (pp. 37, 46-47, 51, 64, 73-86, 123-125, 134, 146-148, 173-175).

*Introduction to 802.11ax High-Efficiency Wireless.* https://www.ni.com/en-us/innovations/white-papers/I6/introduction-to-802-11ax-high-efficiency-wireless.html.

* cited by examiner

ALLOCATING A RESOURCE UNIT TO A STATION

TECHNICAL FIELD

The present disclosure relates generally to allocating one or more resource units to a station.

BACKGROUND

In a wireless communications system, an access point (AP) may communicate with a station (STA) over a wireless communications channel. The wireless communications channel may be divided into multiple resource units (RUs), and the AP may communicate with multiple STAs over different RUs. However, simultaneous communications with multiple STAs and other factors may result in interference. The interference may make it difficult for a STA to receive a message from an AP, or vice versa.

DESCRIPTION OF EXAMPLE EMBODIMENTS

Overview

In one embodiment, an access point is configured with a plurality of resource units (RUs). Each RU is configured to use a frequency range that differs from frequency ranges used by the other RUs. The access point receives first information indicating, for each RU, a first signal quality that the station associates with the respective RU. The access point receives second information indicating, for each RU, a second signal quality that the station associates with the respective RU. The access point further determines, based on at least the first information and the second information, a pattern indicating a recurring signal quality that the station associates with each RU. The access point uses the pattern to allocate one of the RUs for communicating with the station.

Example Embodiments

Certain embodiments of the present disclosure relate generally to allocating one or more RUs to a STA. According to certain embodiments, an AP determines one or more RUs to allocate to the STA based on predicting interference that the STA will experience at a given point in time. To predict interference, the AP may determine a pattern of recurring signal performance experienced by the STA for the different RUs. For example, the AP may determine the pattern of recurring signal performance for a STA that is stationary over a period of time because interference experienced by the STA becomes stochastic when stationary.

Certain embodiments of the present disclosure may provide advantages compared to existing RU allocation methods. For example, certain existing RU allocation methods rely solely on a sounding process performed for each transmission opportunity between the AP and an STA. In such existing RU allocation methods, an AP may use a sounding process to obtain a snapshot of channel conditions experienced by a STA for a given transmission opportunity. During the sounding process, the AP sends a sounding signal to the STA. If the STA successfully receives the sounding signal, the STA responds to the AP with a sounding response, such as an acknowledgement (ACK) signal. The AP and STA perform the sounding process per RU. Thus, the AP can identify RUs for which the STA is experiencing high levels of destructive interference. The AP may then avoid allocating such RUs to the STA for the given transmission opportunity. The AP may repeat the sounding process to obtain updated channel conditions for the next transmission opportunity. By repeating the sounding process, the AP may determine whether interference levels experienced by the STA have changed. As an example, when the STA and/or objects near the STA move locations, the multipath propagation conditions may change in a manner that causes the STA to experience higher levels of interference for certain RUs and lower levels of interference for other RUs. The AP may use the updated channel conditions when allocating an RU to the STA for the next transmission opportunity.

Although existing RU allocation methods may provide a general state of the channel at a particular time, existing RU allocation methods do not describe the effect of multipath over time on selected RUs. By contrast, an advantage of certain embodiments of the present disclosure allows for allocating RUs based at least in part on a pattern of recurring signal performance that describes the effect of multipath on selected RUs over time, e.g., based on statistical analysis of past signal performance. Allocating RUs based on such a pattern may reduce interference because the AP can avoid allocating an RU for which a particular STA experiences recurring interference problems, even if that RU appears not to have an interference problem during the current sounding process. Additionally, certain embodiments may allow an AP to determine whether to increase power in response to interference. For example, certain embodiments allow an AP to determine when interference is likely to be the result of multipath fading (in which case increasing power may be counterproductive) or other type of interference, such as external co-channel interference (in which case increasing power may be beneficial). An advantage of certain embodiments includes improved efficiency because using the pattern of recurring signal performance may allow the sounding process to be performed less frequently (e.g., the sounding process need not be performed for every transmission opportunity when STAs are stationary). Certain embodiments may include all, some, or none of these advantages. Other advantages will be apparent to those of ordinary skill in the art.

Figure 1:
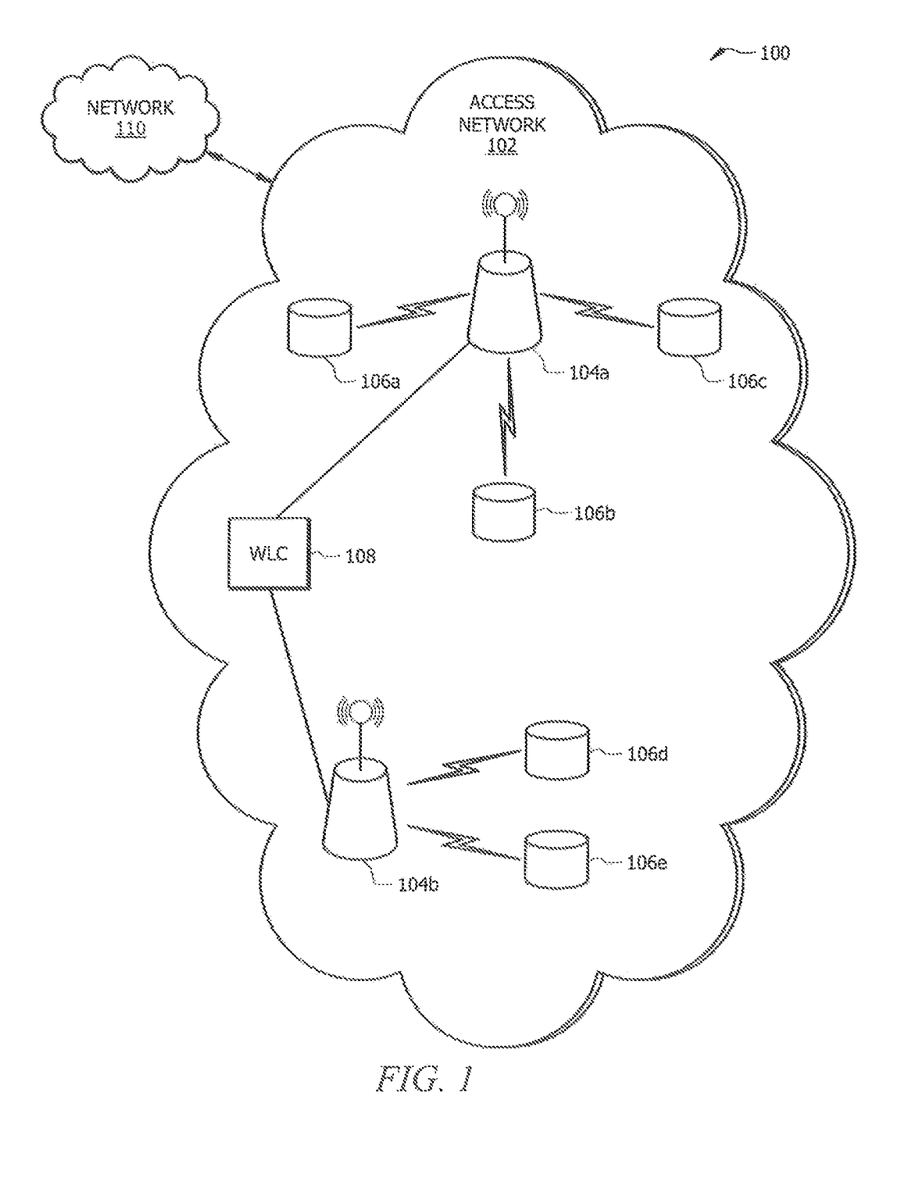
FIG. 1 is a block diagram illustrating an example of a system, according to certain embodiments.

FIG. 1 is a block diagram illustrating an example of a system 100, in accordance with certain embodiments. In the example illustrated in FIG. 1, system 100 includes an access network 102 and a network 110. Access network 102 includes a plurality of access points (APs) 104 in communication with a plurality of stations (STAs) 106. An AP 104 provides a communication interface between a STA 106 and network 110. In the embodiment illustrated in FIG. 1, AP 104a communicates with STAs 106a, 106b, and 106c, and AP 104b communicates with STAs 106d and 106e. More generally, any STA 106 is capable of communicating with any AP 104, provided that the STA 106 is within the coverage area and authorized to communicate with a given AP 104. Communication between AP 104 and STA 106 may include downlink and/or uplink communications via a wireless communication channel. For downlink communications, AP 104 acts as a transmitter and STA 106 acts as a receiver. For uplink communications, AP 104 acts as a receiver and STA 106 acts as a transmitter. Examples of communications between AP 104 and STA 106 are further described below with respect to FIGS. 2-5. Optionally, access network 102 includes a wireless local area network controller (WLC) 108 operable to manage multiple APs 104. For example, WLC 108 may manage the administration and configuration of APs 104.

In some embodiments, access network 102 may comprise a Wi-Fi network, which may be based on an Institute of Electrical and Electronic Engineers (IEEE) 802.11 specification, such as an IEEE 802.11ax. Examples of AP 104 include a femtocell, a hotspot, a picocell, a small cell, a WiFi array, or any other suitable access device, which may be capable of providing suitable connectivity to a wireless device. In certain cases, the access point connects to a router (via a wired network), and it can relay data between the wireless devices and wired devices of the network (e.g., network 110). Examples of STA 106 (which may also be referred to as "user equipment," "endpoint," or "wireless device") include a computer, a personal digital assistant (PDA), a laptop, an electronic notebook, a smartphone, an Internet-of-Things (IoT) device, or any other device, component, element, or object capable of sending or receiving data (e.g., voice, audio, video, media) within system 100. In some embodiments, network 110 may comprise all or a portion of a wireless network, a public switched telephone network (PSTN), an Internet, a public or private data network, a metropolitan area network (MAN), a wide area network (WAN), a local, regional, or global communication network, and/or a local, regional, or global computer network. Modifications, additions, or omissions may be made to system 100. The components of system 100 may be integrated or separated. For example, certain functionality of WLC 108 may be integrated in AP 104. Moreover, the operations of system 100 may be performed by more, fewer, or other components.

Figure 2:
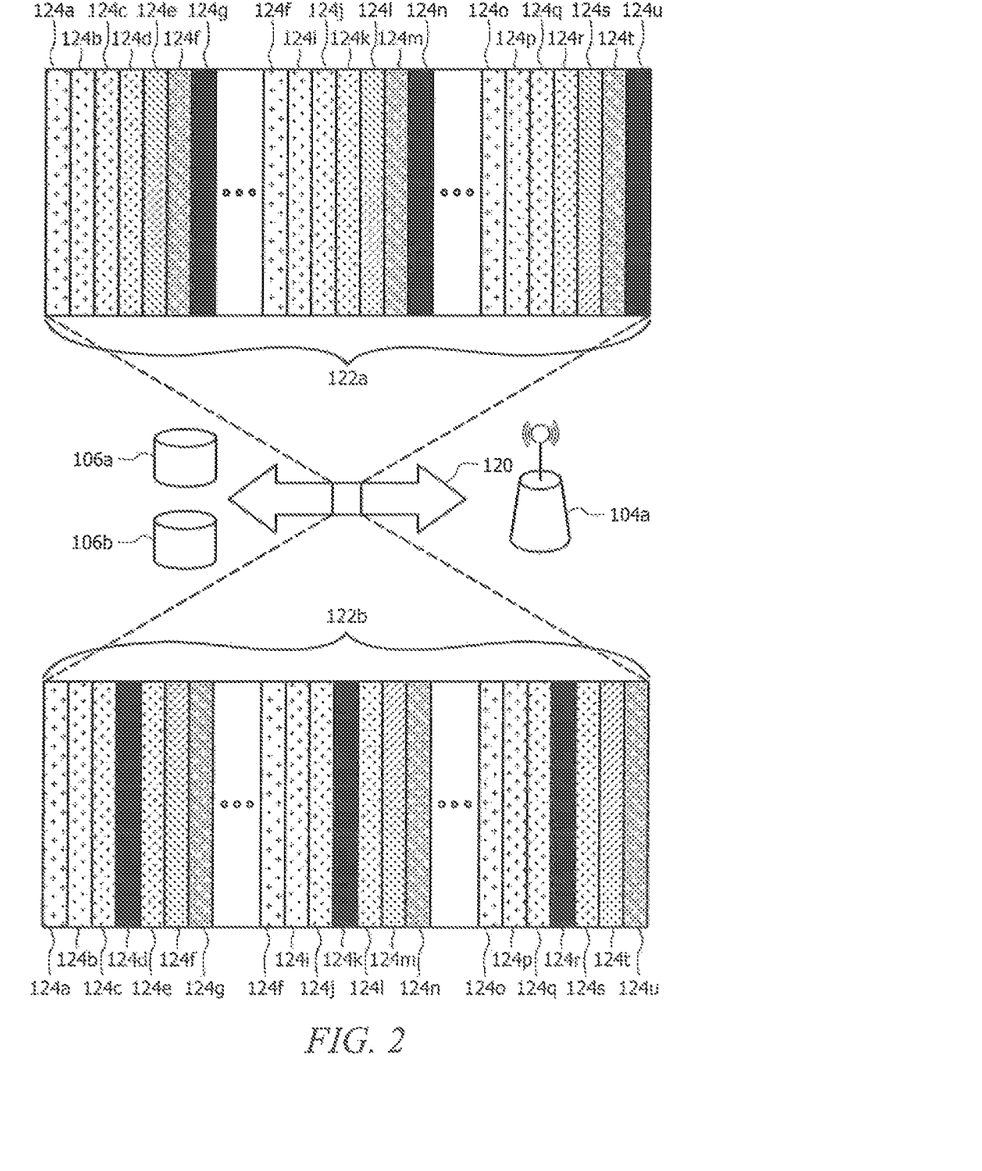
FIG. 2 is a block diagram illustrating an example of an access point that communicates with stations via different resource units, according to certain embodiments.

FIG. 2 is a block diagram illustrating an example of an AP 104a that communicates with STAs 106a and 106b over wireless communication channel 120. Wireless communication channel 120 comprises a plurality of resource units (RUs) 124. An RU 124 may support uplink and/or downlink communications, and AP 104a may communicate with one or more the STAs 106 over multiple RUs 124. Each RU 124 may be associated with a frequency range (e.g., one or more subcarriers or subchannels). Wireless communications channel 120 may have a channel width, and the channel width may be divided into one or more RUs 124. Each RU 124 may use a frequency range that differs from frequency ranges used by the other RUs 124. As an example, wireless communication channel 120 may have a channel width of 160 MHz configured in the 2.4 GHz band, and each RU may use a respective 2 MHz portion of the 160 MHz channel width (e.g., a first RU 124a may use a center frequency of 2.402 GHz, a second RU 124b may use a center frequency of 2.404 GHz, and so on). Other embodiments may use other values for the frequency band, channel width, and/or RU spacing.

Under certain conditions, signals communicated between an AP 104 and a STA 106 may be affected by interference. As an example, a signal communicated between AP 104a and STA 106a may reflect off of surrounding objects in a manner that causes the receiver (STA 106a for downlink signals or AP 104a for uplink signals) to receive the signal via multiple paths. Under certain conditions, the paths may interfere with each other, which may cause multipath fading. The extent to which multipath interference affects a signal communicated between an AP 104 and a STA 106 depends in part on the frequency range associated with the RU 124 used to communicate the signal. That is, different RUs 124 experience different levels of multipath fading. The extent to which multipath fading affects a signal communicated between an AP 104 and a STA 106 also depends on the physical location of the STA 106 relative to the physical location of the AP 104. In FIG. 2, STA 106a and STA 106b may be located in different physical locations. As a result, STA 106a and STA 106b may experience different multipath fading patterns across the RUs 124 of wireless communication channel 120.

According to certain embodiments, AP 104a may determine the RUs 124 for which communications between STA 106a and AP 104a are most likely to experience strong multipath fading or other destructive interference at a given point in time. Because multipath fading depends in part on the physical location of STA 106a relative to the physical location of AP 104a, multipath fading becomes highly stochastic for STA 106a when stationary. As a result, during the times that STA 106a remains stationary, AP 104a may predict which RUs 124 will be affected by strong multipath fading. In certain embodiments, AP 104a determines (e.g., generates or updates) a pattern 122a of signal performance over time in order to predict the performance of RUs 124 with respect to STA 106a. AP 104a may then use pattern 122a when allocating RUs 124 for communications with STA 106a. For example, pattern 122a may be used to avoid allocating RUs 124 likely to experience strong multipath fading or other destructive interference. AP 104a may apply similar methods for other STAs 106. For example, AP 104a determines a second pattern 122b of signal performance over time in order to predict the performance of RUs 124 with respect to a second STA 106b. AP 104a may then use second pattern 122b when allocating RUs 124 for communications with second STA 106b.

In the example of FIG. 2, pattern 122a illustrates recurring signal quality that STA 106a associates with each RU 124 of a plurality of RUs 124a-124u, and pattern 122b illustrates recurring signal quality that STA 106b associates with each RU 124 of a plurality of RUs 124a-124u. Lighter shading indicates RUs 124 associated with relatively low levels of multipath fading, and darker shading indicates RUs 124 associated with relatively high levels of multipath fading. For example, STA 106a experiences relatively high levels of multipath fading on RUs 124f, 124n, and 124u, whereas STA 120b experiences relatively high levels of multipath fading on RUs 124d, 124k, and 124r. Comparing patterns 122a and 122b illustrates that STAs 106a and 106b in different physical locations may experience different levels of multipath fading for the same RUs 124 of the same AP 104a (e.g., RU 124d is better for STA 106a than for STA 106b).

In certain embodiments, AP 104a determines pattern 122a associated with STA 106a based on signals received from STA 106a. AP 104a may receive one or more of the signals from STA 106a in connection an ACK procedure. The ACK procedure begins with AP 104a transmitting signals (e.g., sounding signals) to STA 106a over one or more RUs 124. For example, AP 104a may transmit signals to each RU 124 in wireless communication channel 120 or some subset of the RUs 124. When STA 106a successfully receives the signals, STA 106a responds to AP 104a with one or more ACK signals indicating the RUs 124 over which STA 106a successfully received the signals from AP 104a. In certain embodiments, STA 106a modifies the ACK signal to include one or more signatures. A signature may include any suitable information to identify a particular RU 124. In certain embodiments, the signature identifies an RU 124 based on the transmission frequency associated with that RU 124. As an example, STA 106a may include a value that corresponds to the transmission frequency of RU 124a (e.g., 2.402 GHz) when indicating to AP 104a whether STA 106a successfully received a signal over RU 124a.

In certain embodiments, STA 106a may include an interference index in the ACK signal to indicate which RUs 124 successfully received a signal from AP 104a and/or which RUs 124 failed to successfully receive a signal from AP 104a. STA 106a may use any suitable criteria to determine whether a signal was successfully received over a given RU 124, such as whether a signal was received at all, whether the signal strength or signal power of the received signal exceeded a pre-determined threshold, and/or whether an interference level associated with the received signal was below a pre-determined threshold. The interference index may include an indication (e.g., success or failure) for each RU 124 in wireless communication channel 120 or for a subset of one or more RUs 124, such as RUs 124 for which STA 106a received some signal (whether successfully or unsuccessfully) or RUs 124 that AP 104a has requested STA 106a to include in the interference index. STA 106a may indicate which RUs 124 have been included in the interference index either expressly (e.g., STA 106a may include signatures of the RUs 124 that have been included in the interference index) or implicitly (e.g., a pre-determined mapping may map each RU 124 to one or more corresponding bit positions in the interference index). STA 106a may optionally use the interference index or other field, signal, etc. to provide AP 104a with one or more other types of information related to signal quality for a particular RU 124, such as a received signal strength indicator (RSSI), a received channel power indicator (RCPI), a signal-to-noise ratio (SNR), a signal-to-interference-plus-noise ratio (SINR), an interference score based on multipath conditions, and/or other suitable information.

Upon receiving an ACK signal from the STAs 106a, AP 104a may determine a signal quality that STA 106a associates with one or more RUs 124. In certain embodiments, the presence of a successful acknowledgement may indicate a good signal quality for an RU 124, and the absence of a successful acknowledgement may indicate a poor signal quality for the RU 124. For example, suppose that AP 104a had transmitted signals to STA 106a over RUs 124a, 124b, 124c, 124d, 124e, 124f, and 124g, and AP 104a receives one or more ACK signals from STA 106a indicating that RUs 124a, 124b, 124c, and 124d successfully received the signals. AP 104a does not receive any ACK signal from STA 106a corresponding to RUs 124e, 124f, and 124g (or AP 104a receives ACK signals indicating that STA 106a failed to successfully receive the signals over RUs 124e, 124f, and 124g). Accordingly, STA 106a may determine that the signal quality that STA 106a associates with RUs 124a, 124b, 124c, and 124d is relatively good, and that the signal quality that STA 106a associates with RUs 124e, 124f, and 124g is relatively poor. If the ACK signal(s) include other signal quality-related information (e.g., RSSI, RCPI, SNR, SINR, etc.), AP 104a may use that information when determining a signal quality that STA 106a associates with one or more of the RUs 124.

AP 104a may continue to collect information over time and may update pattern 122a to reflect a recurring signal quality that STA 106a associates with each RU 124 of a plurality of RUs 124a-124u. Updating pattern 122a to reflect recurring signal quality may allow AP 104a to distinguish RUs 124 for which the signal quality experienced by STA 106a is routinely poor from RUs 124 for which the signal quality experienced by STA 106a is temporarily poor, or to predict times when STA 106a is likely to experience good signal quality over a particular RU 124. For example, certain loading conditions of AP 104a and/or movement of objects in the coverage area of AP 104a may occur according to recurring patterns that may result in predictable interference conditions for STA 106a.

To collect information over time, AP 104a may periodically repeat the ACK procedure. For example, AP 104a may repeat the ACK procedure according to regular time intervals or based on the occurrence of certain events, such as every Nth transmission opportunity (wherein N may be any suitable number, such as 1, 2, 3, 4, 5, etc.). Increasing N reduces the signaling overhead associated with repeating the ACK procedure. Thus, N may be increased in conditions where multipath fading remains relatively stable, such as when AP 104a, STA 106a, and surrounding objects remain substantially stationary. The value of N may be set statically (e.g., pre-configured by a network administrator) or dynamically (e.g., automatically updated by AP 104a based on network conditions). In certain embodiments, AP 104a may repeat the ACK procedure according to a rotation-based scanning procedure that tests RUs 124 by subset. During a first ACK procedure, AP 104a may transmit signals to test a first subset of RUs 124, such as RUs 124a-g. During a second ACK procedure, AP 104a may transmit signals to test a second subset of RUs 124, such as RUs 124h-n. During a third ACK procedure, AP 104a may transmit signals to a test a last subset of RUs 124, such as RUs 124o-u. AP 104a may then repeat the ACK procedure according to a subset-by-subset rotation.

Any suitable number of subsets may be used, and each subset may include any suitable number of RUs 124. The frequency ranges associated with RUs 124 in a subset may be contiguous (e.g., RUs 124a and 124b), non-contiguous RUs (e.g., RUs 124a and 124d), or some combination of both (e.g., RUs 124a, 124b, and 124d). Subsets may be fixed such that the same RUs 124 are grouped together from one rotation to the next, or subsets may be determined dynamically. AP 104a may determine which RUs 124 to include in a subset and/or which subset to test during a particular ACK procedure according to any suitable criteria, such as round robin, weighted round robin, least connections, weighted least connections, previous signal quality, random, etc. In certain embodiments, the rotation-based scanning procedure sweeps the bandwidth of wireless communication channel 120 to determine dark zones (frequencies with high multipath fading) and generate pattern 122 to provide a fingerprint of the dark zones.

In certain embodiments, AP 104a may use different configuration settings for different ACK procedures testing the same RU 124 in order to determine how the same RU 124 performs under different conditions (such as when AP 104a increases or decreases its transmission power or when AP 104a changes its beamforming configuration). AP 104a may iteratively test the different configuration settings to determine preferred configuration settings. Although the previous examples have described using an ACK procedure to collect information indicating signal quality, in certain embodiments, AP 104a may use other signals from STA 106a (such as data transmissions or special management signals) to assess signal quality. Such other signals may be used either as an alternative to or in addition to the ACK signals. Certain embodiments may test reception of downlink signals, uplink signals, or both. Multipath interference tends to be mostly symmetrical, so testing the downlink may provide adequate information about the uplink, and vice versa.

In certain embodiments, pattern 122a may comprise a gradient compatibility list indicating, for each RU 124, a level of compatibility between STA 106a and the respective RU 124 over time. For example, the gradient compatibility list may list a first RU 124a with a corresponding first compatibility value, a second RU 124b with a corresponding second compatibility value, and so on for each RU 124 (or each tested RU 124) in the wireless communications channel 120. Each compatibility value may be based on information collected over a period of time. For example, a compatibility value may be based on one or more of the following: a number of times AP 104a received an ACK signal indicating that STA 106a successfully received a signal over the corresponding RU 124, a number times AP 104a received an ACK signal indicating that STA 106a failed to successfully received a signal over the corresponding RU 124, a number times AP 104a failed to receive any ACK signal from STA 106a during an ACK procedure attempt for the corresponding RU 124, a total number of ACK procedure attempts for the corresponding RU 124, and/or other signal quality-related information received from STA 106a (e.g., RSSI, RCPI, SNR, SINR, etc.). The compatibility value may be updated in any suitable manner, such as continuously as new data is received or periodically, for example, according to pre-determined time intervals.

Any suitable method may be used to determine the compatibility value. For example, AP 104a may use a mean, median, mode, range, maximum, and/or minimum values over a period of time to determine the compatibility value. In certain embodiments, AP 104a may apply some weighting, statistical analysis, or other calibration, for example, to reduce the effect of outlier data or older data on the compatibility value. FIG. 2 illustrates an example in which pattern 122a includes a relatively good compatibility value for RU 124a (indicated by light shading) and a relatively poor compatibility value for RU 124g (indicated by dark shading). In certain embodiments, AP 104a may maintain multiple patterns 122a for STA 106a. For example, a first pattern 122a-1 may indicate recurring pattern under certain conditions (such as daytime conditions when more objects tend to be located in the coverage area of AP 104a and/or loading tends to be heavier) and a second pattern 122a-2 may indicate a recurring pattern under other conditions (such as nighttime conditions when fewer objects tend to be located in the coverage area of AP 104a and/or loading tends to be lighter).

As discussed above, AP 104a may use pattern 122a (e.g., the gradient compatibility list) when allocating RUs 124 to STA 106a. For example, if pattern 122a indicates that STA 106a routinely experiences constructive interference (or low destructive interference) over RU 124a, then AP 104a may prioritize allocating RU 124a to STA 106a. If pattern 122a indicates that STA 106a routinely experiences strong destructive interference over RU 124g, then AP 104a may avoid allocating RU 124g to STA 106a. Because pattern 122a indicates recurring signal quality over a period of time, using pattern 122a may allow AP 104a to make more accurate RU allocation determinations compared to other methods that rely solely on a sounding process performed for the current transmission opportunity. For example, AP 104a may use pattern 122a to avoid allocating RU 124g to STA 106a even if the current sounding process indicates a good signal quality for RU 124g. By contrast, other methods that rely solely on a sounding process performed for the current transmission opportunity may allocate an RU 124 that appears to have good signal quality during the sounding phase (e.g., RU 124g) but ends up having poor signal quality during the corresponding exchange phase.

In certain embodiments, AP 104a may determine an RU 124 to allocate for communication with STA 106a based on a combination of pattern 122a and the results of a sounding process for the current transmission opportunity. For example, AP 104a may use pattern 122a as a positive or negative weighting factor for the results of the current sounding process. Accordingly, AP 104a may give high priority to an RU 124 that routinely experiences constructive interference (or low destructive interference) according to pattern 122a and that currently has a good signal quality according to the sounding process. AP 104a may give intermediate priority to an RU 124 that routinely experiences average interference according to pattern 122a and that currently has a good signal quality according to the sounding process. AP 104a may give low priority to an RU 124 that routinely experiences strong destructive interference even if the RU 124 currently has a good signal quality according to the sounding process. AP 104a may use any suitable granularity when prioritizing RUs 124. For example, AP 104a may prioritize RUs 124 into tiers such that RUs 124 with relatively similar performance have the same priority, or AP 104a may prioritize RUs 124 according to individual scores per RU 124. AP 104a may apply any suitable weighting to pattern 122a. For example, certain embodiments may give greater weight to pattern 122a, other embodiments may give greater weight to the current sounding process, and other embodiments may use some combination (e.g., pattern 122a may be given greater weight for RUs 124 that routinely have good signal quality or poor signal quality, and the current sounding process may be given greater weight for RUs 124 that routinely have intermediate signal quality).

In certain embodiments, AP 104a may use pattern 122a to determine when to send redundant transmissions to STA 106a. For example, AP 104a determines the ratio of failing RUs 124a based on pattern 122a and uses that information to add RUs 124 for forward error correction (FEC). Single transmissions can be used with RUs 124 for which pattern 122a indicates statistically high performance (indicated by lighter shading in FIG. 2). Multiple transmissions can be used with RUs 124 for which pattern 122a indicates statistically low performance (indicated by darker shading in FIG. 2). In certain embodiments, multiple transmissions may comprise frame duplication over another RU 124, such as in Dual Carrier Mode (DCM).

In certain embodiments, AP 104 may use special management signals (e.g., Operations, Administration, and Maintenance (OAM) signals) to explore the wireless communications spectrum available to an AP 104 and STA 106 pair. In doing so, AP 104 may use a rotation-based scanning procedure to scan all RUs 124 used by the AP 104 to communicate with a STA 106. Over time, AP 104 transmits signals to STA 106 over each RU 124 within the wireless communications channel 120. In some embodiments, AP 104 may perform this rotation-based scanning procedure over an interval of time, such that the rotation restarts at the end of the interval. In some embodiments, AP 104 may perform this rotation-based scanning procedure in response to an event, such as whenever AP 104 detects that a new STA 106 has entered the coverage area and is authorized to connect to AP 104. The rotation-based scanning procedure may allow an AP 104 to determine a pattern 122 indicating a success rate, per RU 124, for communications transmitted to and received from a particular STA 106. AP 104 can use pattern 122 to allocate RUs 124 associated with a high success rate. Thus, in certain embodiments, selection RUs 124 need not be based on a linear distributive function (where the only goal of the radio-resource management (RRM) channel distributive function is to limit interference between neighboring APs 104), but can be driven by highest combined RU 124 transmit/receive (Tx/Rx) success for each AP 104 (where APs 104 are also pushed to non-overlapping RUs 124 that provide the highest count of successful RUs 124 for that AP 104 and location).

In certain embodiments, the AP 104 may use RUs 124 which correspond to strong constructive interference to transmit traffic that has high quality of service (QOS) requirements and/or traffic that has a lower tolerance to loss. In certain embodiments, RUs 124 become subject to stronger constructive interference the farther away in frequency they move from RUs 124 subject to strong destructive interference. For example, when RUs 124 at a first frequency (e.g., 2.414 GHz) and a second frequency (e.g., 2.428 GHz) are subject to strong destructive interference, an RU 124 spaced approximately in the middle of the first and second frequency (e.g., at 2.420 GHz or 2.422 GHz) may experience strong constructive interference. The RUs 124 subject to strong constructive interference may correspond to the RUs 124 associated with high gradient compatibility list values. Traffic marking may be used to identify traffic with high QOS or low loss requirements.

For simplicity, certain examples have been described with respect to communications between AP 104a and STA 106a. An AP 104 may perform similar techniques for multiple STAs 106 (e.g., AP 104a may determine a pattern for STA 106a, a pattern for STA 106b, a pattern for STA 106c, etc.). As an example, during a first time period (e.g., first transmission opportunity), AP 104a may transmit signals to STA 106a over RUs 124a, 124b, and 124c and to STA 106b over RUs 124d, 124e, and 124f. During a subsequent period of time (e.g., second transmission opportunity), AP 104a may transmit signals to STA 106a over RUs 124d, 124e, and 124f and to STA 106b over RUs 124a, 124b, and 124c. A scheduler for AP 104 may coordinate allocation of RUs 124 among STAs 106. If the scheduler detects a compatibility between a STA 106a and RU 124a, the scheduler may allocate RU 124a to STA 106a if a sounding to a sub-group of other STAs 106 (e.g., STAs 106b and 106c), such as other stationary STAs 106, reveals multiple input multiple output (MIMO) map compatibility with the proposed allocation. In certain embodiments, one single gradient compatibility list may comprise compatibility information for one or more STAs 106. The following table provides an example.

| AP 104a | | | | |
|---|---|---|---|---|
| | STA 106a | STA 106b | STA 106c | ... STA 106n |
| RU 124a | Good | Good | Poor | ... Intermediate |
| RU 124b | Good | Good | Intermediate | ... Poor |
| RU 124c | Intermediate | Intermediate | Good | ... Poor |
| ... | ... | ... | ... | ... ... |
| RU 124n | Poor | Intermediate | Good | ... Good |

Multiple APs 104 may determine patterns for STAs 106. For example, each AP 104 may determine patterns for STAs 106 within AP 104's coverage area. In some cases, multiple APs 104 may determine a pattern for the same STA 106. For example, if STA 106a is within coverage of both AP 104a and AP 104b, then AP 104a may determine a first pattern indicating signal quality between AP 104a and STA 106a, and AP 104b may determine a second pattern indicating signal quality between AP 104b and STA 106a.

Figure 3:
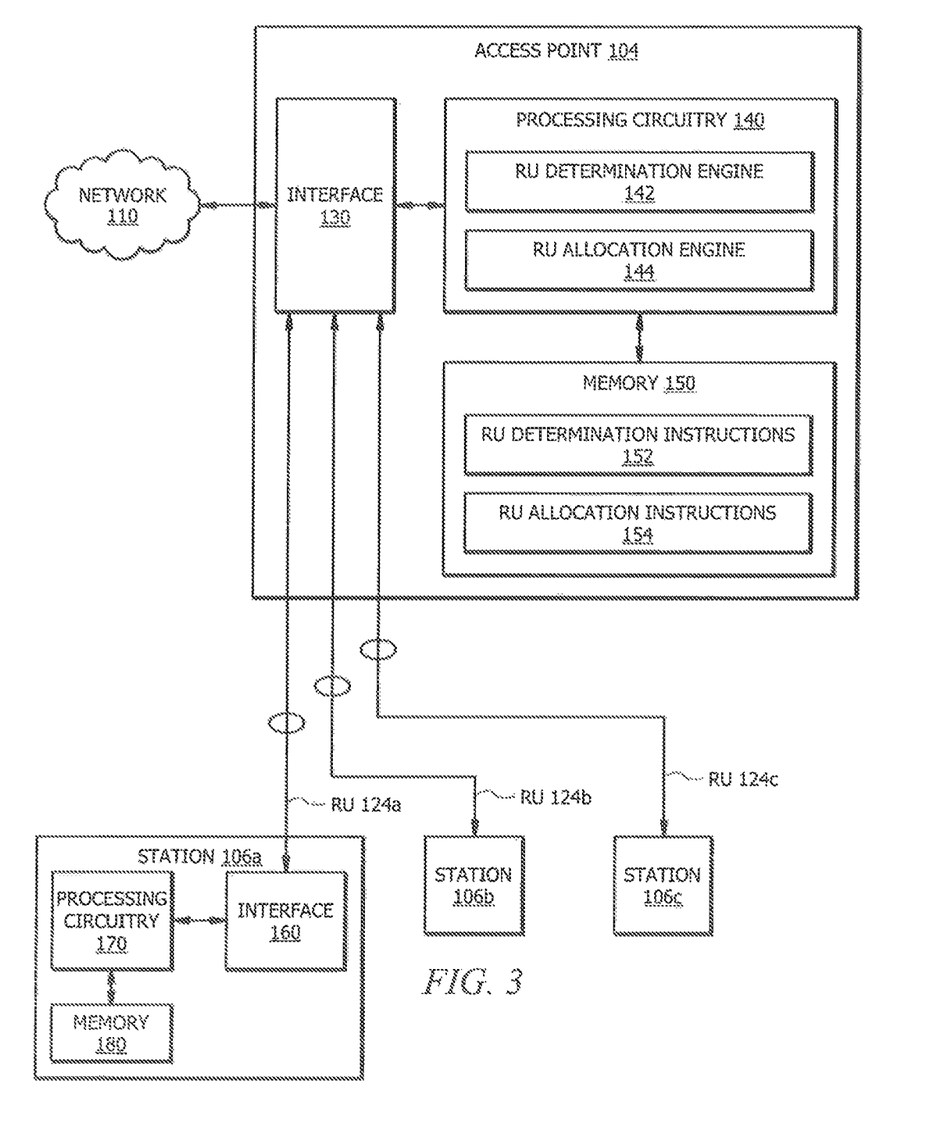
FIG. 3 is a block diagram illustrating example components of an access point and a station, according to certain embodiments.

FIG. 3 is a block diagram illustrating example components of AP 104 and STA 106, according to certain embodiments. AP 104 comprises one or more interfaces 130, processing circuitry 140, and memory 150. Similarly, STA 106 comprises one or more interfaces 160, processing circuitry 170, and memory 180. In general, an interface 130 or 160 receives input and provides output to facilitate communication between devices or components, processing circuitry 140 or 170 executes program code to perform the functionality of the device, and memory 150 or 180 stores information.

Examples of an interface 130 or 160 may include an internal bus or other circuitry to communicate data between components within the device, a wireless interface (which may include a transmitter to transmit wireless signals and a receiver to receive wireless signals), and/or a network interface (which may include a wired or wireless interface to communicate with switches, routers, or other components of a network). An interface 130 or 160 may be configured to use any suitable type of communication protocol and may comprise any suitable protocol converter, modem, and/or other logic to receive an input and provide an output.

Processing circuitry 140 or 170 comprises any electronic circuitry including, but not limited to, one or more processors, microprocessors, microcontrollers, central processing unit (CPU) chips, state machines, logic units, cores (e.g. a multi-core processor), field-programmable gate array (FPGAs), application specific integrated circuits (ASICs), digital hardware, digital signal processors (DSPs), special-purpose digital logic, any suitable hardware and/or software for processing data, or a combination of the preceding. Processing circuitry 140 or 170 may be configured to execute program code stored in memory 150 or 180, respectively, which may include one or several types of memory such as read-only memory (ROM), random-access memory (RAM), cache memory, flash memory devices, optical storage devices, non-transitory computer readable media, etc. Program code stored in memory may include instructions (such as logic, rules, etc.) for executing one or more telecommunications and/or data communications protocols as well as instructions for carrying out one or more of the techniques described herein.

In certain embodiments, memory 150 of AP 104 may store RU determination instructions 152, and processing circuitry 140 of AP 104 may be configured to execute RU determination instructions 152 in order to implement an RU determination engine 142. RU determination engine 142 may determine a pattern 122 indicating a recurring signal quality that a STA 106 associates with each RU 124 of a plurality of RUs 124. In certain embodiments, RU determination engine 142 causes AP 104 to transmit signals to STA 106a via a plurality of RUs 124. RU determination engine 142 receives ACK signals from STA 106a. As discussed above with respect to FIG. 2, an ACK signal may provide AP 104 with a signature of each RU 124 to which the ACK signal pertains and, for each RU 124 identified in the ACK signal, an indication whether the RU 124 successfully received the signal. In some embodiments, the ACK signal may include an interference index to indicate a performance of each tested RU 124. RU determination engine 142 may analyze the ACK signal received from STA 106*a* to determine pattern 122*a*, such as a gradient compatibility list. In some embodiments, RU determination engine 142 causes AP 104 to repeatedly determine the performance of each RU 124 for the STA 106*a* over time in order to update pattern 122*a*. RU determination engine 142 may cause AP 104 to perform the determination in response to an event (e.g., detection of STA 106*a*), during a specific period of time, repeatedly at regular intervals, or as may otherwise be needed. Additional examples for testing RUs 124 and determining pattern 12*a* are discussed above with respect to FIG. 2.

In certain embodiments, memory 150 of AP 104 may store RU allocation instructions 154, and processing circuitry 140 of AP 104 may be configured to execute RU allocation instructions 154 in order to implement an RU allocation engine 144. RU allocation engine 144 may cause AP 104 to use pattern 122*a* when allocating an RU 124 for communication between AP 104 and STA 106*a*. For example, RU allocation engine 144 may avoid selecting an RU 124 for which pattern 122*a* indicates that STA 106*a* often experiences relatively high levels of multipath fading. Additional examples for prioritizing and allocating RUs 124 are discussed above with respect to FIG. 2.

Modifications, additions, or omissions may be made to the devices shown in FIG. 3 (AP 104 and/or STA 106). As an example, although FIG. 3 illustrates RU determination engine 142 and RU allocation engine 144 allocated on a single AP 104, other embodiments may implement functionality of RU determination engine 142 and/or RU allocation engine 144 on another node, or portions of the functionality may be distributed among other nodes, such as one or more APs 104, STAs 106, and/or WLC 108. In certain embodiments, AP 104 and a controller (e.g., WLC 108) may work together to perform the described functionality. For example, AP 104 may obtain signal quality information from STA 106 on a recurring basis and may provide the signal quality information to WLC 108. WLC 108 may use the signal quality information to generate or update pattern 122 (e.g., a gradient compatibility list). WLC 108 may instruct AP 104 which RU 124 to allocate based on pattern 122, or WLC 108 may provide AP 104 with pattern 122 so that AP 104 can use pattern 122 to select RU 124. More generally, the components of a device may be integrated or separated. Moreover, the functionality of a device may be performed by more, fewer, or other components. The components within a device may be communicatively coupled in any suitable manner.

Figure 4:
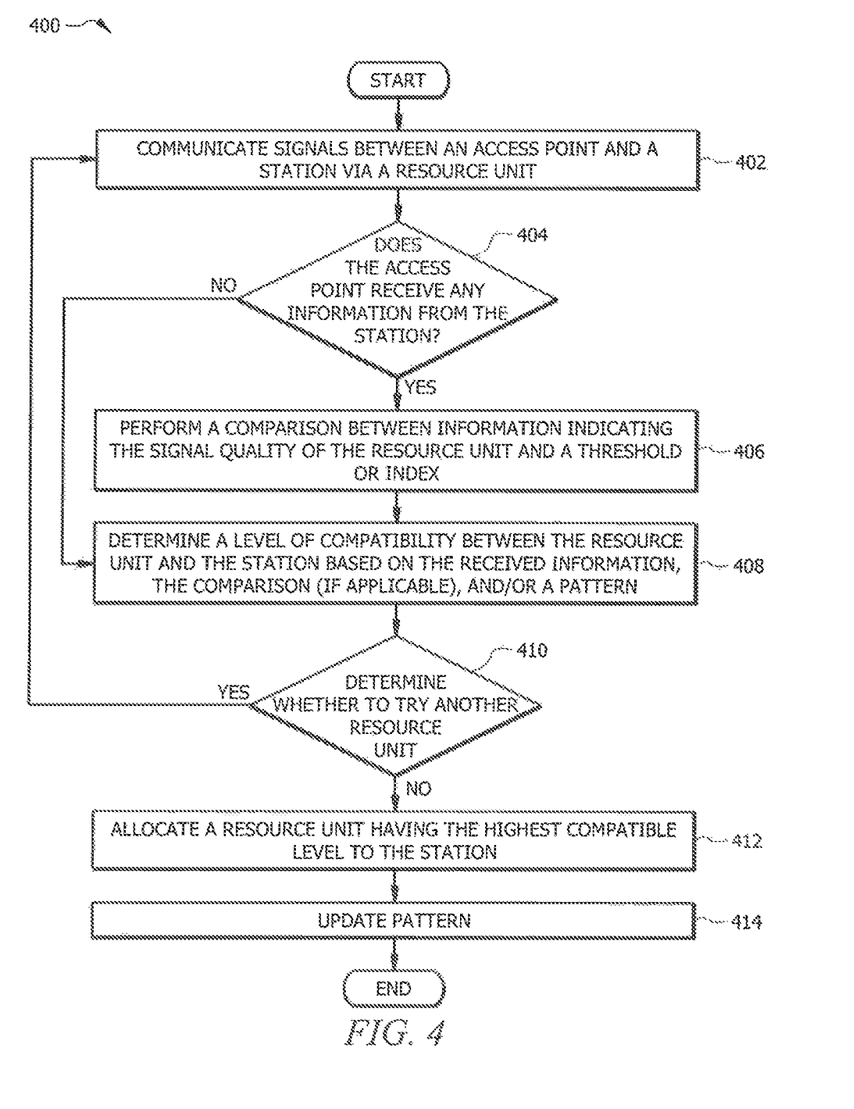
FIG. 4 is a flow diagram illustrating an example method for allocating a resource unit to a station, according to certain embodiments.

FIG. 4 is a flow diagram illustrating an example method 400 for allocating an RU 124 to a STA 106, according to certain embodiments. Method 400 may select preferred RUs 124 to allocate to STA 106 based on a pattern 122 of RU performance. Method 400 starts at step 402 with communicating signals between an AP 104 (e.g., AP 104*a*) and a STA 106 (e.g., STA 106*a*) via an RU 124 (e.g., RU 124*a*). In certain embodiments, communicating signals may comprise using RU 124*a* to send downlink signals to STA 106*a*. In certain embodiments, communicating signals may comprise allocating RU 124*a* for uplink communications from STA 106*a*. In certain embodiments, AP 104*a* and STA 106*a* may communicate signals over multiple RUs 124.

At step 404, RU determination engine 142 determines whether AP 104*a* receives information from STA 106*a*. In certain embodiments, the information may comprise an indication of signal quality that STA 106*a* associates with the current RU 124*a*. The signal quality that STA 106*a* associates with the current RU 124*a* is affected by the frequency range of RU 124*a* (e.g., depending on whether multipath propagation results in constructive or destructive interference for the frequency range of RU 124*a*). If at step 404 RU determination engine 142 determines that AP 104*a* receives the information from STA 106*a*, the method proceeds to step 406. If at step 404 RU determination engine 142 determines that AP 104*a* does not receive the information from STA 106*a*, the method proceeds to step 408.

At step 406, RU determination engine 142 performs a comparison. The comparison compares information indicating the signal quality of RU 124*a* (information received in step 404) with a threshold and/or an index. In certain embodiments, the indicated signal quality itself may be compared to the threshold. In other embodiments, a value based on the indicated signal quality (such as a weighted value) may be compared to the threshold. In certain embodiments, the indication of signal quality may be received as part of an interference index that indicates whether signals were successfully communicated between AP 104*a* and STA 106*a* over RU 124*a*. The success/failure indication for RU 124*a* may be compared to success/failure indications for other RUs 124. As an example, if the interference index comprises a table, different rows (or columns) of the same interference index may be compared to one another. As another example, one interference index may be compared to another interference index (such as another interference index obtained for one or more other RUs 124 during the current or most recent iteration of a rotation-based scanning procedure).

At step 408, RU determination engine 142 determines a level of compatibility for a pairing between STA 106*a* and the current RU 124*a* of AP 104*a*. In some embodiments, the compatibility level may be determined based at least in part on the information received in step 404. In some embodiments, the compatibility level may be determined based at least in part on the comparison performed in step 406, if applicable (as discussed above, step 406 may be skipped if step 404 results in a "no" determination). In some embodiments, the compatibility level may be determined based at least in part on pattern 122*a* of recurring signal quality. Pattern 122*a* may indicate recurring signal quality in any suitable manner. In some embodiments, pattern 122*a* may indicate recurring signal quality in terms of performance of RU 124*a* relative to one or more pre-determined criteria (such as to success-to-failure ratio over a period of time, average RSSI, RCPI, SNR, SINR, etc. over a period of time, or other criteria) or relative to other RUs 124 (such as whether RU 124*a* has a higher rate of successfully receiving signals than other RUs 124 over a period of time, whether RU 124*a* has a better average RSSI, RCPI, SNR, SINR, etc. compared to other RUs 124 over a period of time, or other relative criteria). Other examples of pattern 122*a* and its uses are described above with respect to FIG. 2. As discussed above, pattern 122*a* may be used as a weighting factor for other information (such as information obtained in step 404 and/or step 406).

Factors that suggest a good compatibility level may include one or more of: the presence of information from STA 106*a* (e.g., if AP 104*a* received information from STA 106*a* via RU 124*a* in step 404), an indication that STA 106*a* successfully received a signal from AP 104*a* via RU 124*a* (e.g., according to an interference index received from STA 106*a* in step 404), an indication that the signal quality (or a value based on the signal quality) exceeds a pre-determined threshold (e.g., based on the comparison of step 406), and an indication that RU 124*a* has recurring good signal quality according to pattern 122*a*. Factors that suggest a poor compatibility level may include one or more of: the absence of information from STA 106*a* (e.g., AP 104*a* failed to receive information from STA 106*a* in step 404), an indication that STA 106*a* failed to successfully receive a signal from AP 104*a* via RU 124*a* (e.g., according to an interference index received from STA 106*a* in step 404), an indication that the signal quality (or a value based on the signal quality) falls below a pre-determined threshold (e.g., based on the comparison of step 406), and an indication that RU 124*a* has recurring poor signal quality according to pattern 122*a*.

In certain embodiments, the compatibility level may be increased or decreased in order to prioritize use of a particular RU 124 by a particular STA 106. For example, RU determination engine 142 may determine to prioritize RU 124*a* for use by a different STA 106 (e.g., STA 106*b*) if STA 106*b* has higher QOS requirements, less tolerance for loss, or better signal quality compatibility with RU 124*a* than STA 106*a*. Accordingly, the compatibility level may be decreased for STA 106*a* to allow RU 124*a* to be allocated to STA 106*b*.

At step 410, RU determination engine 142 determines whether to try another RU 124 (e.g., RU 124*b*). In some embodiments, RU determination engine 142 may determine to try another RU 124*b* as part of a rotation-based scanning procedure. In some embodiments, RU determination engine 142 may determine to try another RU 124*b* in response to determining that STA 106*a* and RU 124*a* have low compatibility (as determined in step 408). For example, the compatibility level may be compared to a threshold to determine whether to try another RU 124*b*. If at step 410 RU determination engine 142 determines to try another RU 124*b*, the method returns to step 402 to repeat the steps for the other RU 124*b*. The method may be repeated for any suitable number of RUs 124. If at step 410 RU determination engine 142 determines that AP 104*a* does not need to try another RU 124, the method proceeds to step 412.

At step 412, RU allocation engine 144 allocates an RU 124 to STA 106*a* based at least in part on the compatibility level (which RU allocation engine 144 may receive from RU determination engine 142). Because certain embodiments determine the compatibility level based at least in part on pattern 122 (as discussed for step 408), in effect, the allocation scheme in these embodiments depends on pattern 122. In certain embodiments, RU allocation engine 144 allocates the RU 124 having the highest compatibility level. In certain embodiments, RU allocation engine 144 selects any RU 124 from among a group of RUs 124 having relatively high compatibility. Thus, RU allocation engine 144 may avoid allocating an RU 124 with low compatibility (high interference) while still providing the flexibility to allocate from among a group of RUs 124. This flexibility may be useful to facilitate resource-sharing or scheduling among multiple STAs 106 that may potentially have similar levels of compatibility as other STAs 106 with respect to some of the same RUs 124. In certain embodiments, RU allocation engine 144 may allocate any RU 124 (including an RU 124 with low compatibility) and may use the compatibility level to determine whether to provide some additional interference-mitigation, such as FEC or DCM.

At step 414, RU determination engine 142 updates pattern 122*a*. For example, RU determination engine 142 may update pattern 122*a* based on information obtained in any of steps 404, 406, and/or 408. In certain embodiments, RU determination engine 142 performs the step of updating pattern 122*a* by analyzing the information itself. In some embodiments, RU determination engine 142 may perform the step of updating pattern 122*a* by sending the information to be analyzed by another node (e.g., WLC 108) such that RU determination engine 142 obtains updated pattern 122*a* from the other node.

Modifications, additions, or omissions may be made to the method of FIG. 4. The method may include more, fewer, or other steps. Additionally, steps may be performed in any suitable order. For purposes of example, certain steps have been described as being performed by RU determination engine 142 and RU determination engine 144. However, the steps may be performed by more, fewer, or other components, and the functionality may be distributed among the components in any suitable manner. For example, certain portions of the functionality described as being performed by RU determination engine 142 may be performed by RU determination engine 144 or other components, and vice versa.

Figure 5:
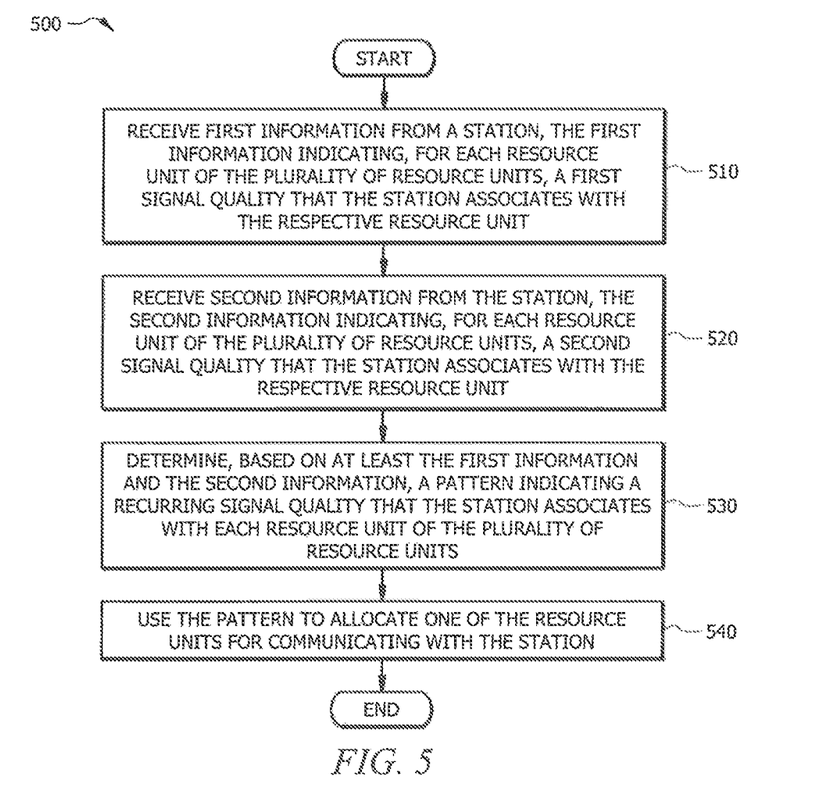
FIG. 5 is a flow diagram illustrating an example method for determining a pattern that a station associates with resource units, according to certain embodiments.

FIG. 5 is a flow diagram illustrating an example method 500 for determining a pattern that a STA 106 associates with RUs 124, according to certain embodiments. Method 500 may be performed by an AP, such as AP 104*a* described with respect to FIGS. 1-4. AP 104*a* may be configured with a plurality of RUs 124. Each RU 124 may be configured to use a frequency range that differs from frequency ranges used by the other RUs 124 of AP 104*a*. In other words, each RU 124 of AP 124 may be assigned its own unique center frequency. The plurality of RUs 124 may refer to each RU 124 in a wireless communication channel 120 or a subset of RUs 124 for which signal quality is to be tested (e.g., RUs 124 to be included in pattern 122).

Method 500 begins at step 510 with receiving first information from a STA, such as STA 106*a* described with respect to FIGS. 1-4. The first information indicates, for each RU 124 of the plurality of RUs 124, a first signal quality that STA 106*a* associates with a respective RU 124. The frequency range associated with a particular RU 124 affects the first signal quality. For example, signals transmitted over certain frequencies tend to be more susceptible to multipath fading than signals transmitted over other frequencies. Objects in the surrounding environment and the physical location of STA 106*a* relative to the physical location of AP 104*a* affects which frequencies are susceptible to multipath fading.

With respect to step 510, the first information received from STA 106*a* indicates a first signal quality for each of the plurality of RUs 124. As an example, first information may indicate signal quality A1 for RU 124*a*, signal quality B1 for RU 124*b*, signal quality C1 for RU 124*c*, and so on. Examples of different ways that STA 106*a* may indicate signal quality are provided above for FIGS. 1-4. As discussed above, STA 106*a* may indicate signal quality as a simple success or failure to receive a signal on a particular RU 124, or STA 106*a* may indicate signal quality by providing AP 104*a* with more detailed information (e.g., RSSI, RCPI, SNR, SINR, interference score, etc.). As also discussed above, information received from STA 106*a* may include one or more signatures associated RUs 124 and/or an interference index.

In some embodiments, the first information of step 510 is received in response to an earlier step (not shown) in which method 500 transmits signals (e.g., sounding signals) from AP 104*a* to STA 106*a* via the plurality of RUs 124. Accordingly, the first information may comprise one or more ACK signals (e.g., one or more sounding response signals). In some embodiments, the first information may be received in multiple messages over a period of time. For example, the first information may be received in response to a rotation-based scanning procedure initiated by AP 104*a*. The rotation-based scanning procedure prompts STA 106*a* to provide the first information for each RU 124 of the plurality of RUs 124 on an RU-by-RU (or subset-by-subset) basis. See the discussion of FIG. 2 above for a more detailed examples of a rotation-based scanning procedure.

At step 520, the method 500 receives second information from the station. The second information may indicate, for each RU 124 of the plurality of RUs 124, a second signal quality that STA 106*a* associates with the respective RU 124. As an example, second information may indicate signal quality A2 for RU 124*a*, signal quality B2 for RU 124*b*, signal quality C2 for RU 124*c*, and so on. The second signal quality may be affected by the frequency range of the respective RU 124 (e.g., due to multipath propagation). The second information is generally similar to the first information discussed with respect to step 510, but obtained at a different time. For example, the first information may be obtained for a first transmission opportunity and the second information may be obtained for a second (subsequent) transmission opportunity. In embodiments using the rotation-based scanning procedure, the first information may be obtained during a first scan (e.g., a first sweep) of RUs 124, and the second information may be obtained during a second scan (e.g., a second sweep) of RUs 124, wherein the first and second scans may each be performed on an RU-by-RU basis or a subset-by-subset basis. Thus, in some embodiments, the second information of step 520 is received in response to an earlier step (not shown) in which method 500 transmits signals (e.g., sounding signals) from AP 104*a* to STA 106*a* via the plurality of RUs 124.

At step 530, the method 500 determines, based on at least the first information and the second information, a pattern 122 indicating a recurring signal quality that STA 106*a* associates with each RU 124 of the plurality of RUs 124. In some embodiments, pattern 122*a* may indicate a recurring pattern of multi-path fading experienced by STA 106*a* when located at a given physical location. Examples of methods for determining pattern 122*a* are discussed above with respect to FIGS. 2-4. Determining pattern 122*a* may include generating a new pattern or updating an existing pattern. In some embodiments, AP 104*a* may perform the step of determining pattern 122*a* (step 530) by analyzing the first information and second information itself In some embodiments, AP 104*a* may perform the step of determining pattern 122*a* (step 530) by sending the first and second information to be analyzed by another node (e.g., WLC 108) such that AP 104*a* obtains pattern 122*a* from the other node.

At step 540, the method 500 uses pattern 122*a* when allocating at least one of the RUs 124 for communicating with STA 106*a*. Pattern 122*a* may be applied to allocate RUs 124 for uplink and/or downlink communication. In some embodiments, using pattern 122*a* to allocate RUs 124 may comprise abstaining from allocating an RU 124 for which the recurring signal quality falls below a minimum signal quality threshold. The threshold may be based on any suitable criteria, such as a success-to-failure ratio of an ACK procedure for the RU 124 or statistical analysis of other signal-quality related information (e.g., one or more of RSSI, RCPI, SNR, SINR, etc.). In some embodiments, using pattern 122*a* may comprise abstaining from allocating an RU 124 for which the recurring signal quality is poor compared to the recurring signal quality of one or more of the other RUs 124. Additional examples of prioritizing RUs 124 for allocation by to STA 106*a* according to pattern 122*a* are described above with respect to FIGS. 2-4. As discussed with respect to FIGS. 2-4, in certain embodiments, allocating RU 124 may be based on a combination of pattern 122*a* and other information. For example, pattern 122*a* may be used as a weighting factor for other information.

In one embodiment, method 500 further comprises periodically receiving additional information from STA 106*a* and updating pattern 122*a* based on the additional information. The additional information may indicate, for each RU 124 of the plurality of RUs 124, an additional signal quality that STA 106*a* associates with the respective RU 124. As an example, one set of additional information may indicate signal quality A3 for RU 124*a*, signal quality B3 for RU 124*b*, signal quality C3 for RU 124*c*, and so on. The additional signal quality may be affected by the frequency range of the respective RU 124 (e.g., due to multipath propagation). The additional information is generally similar to the first information discussed with respect to step 510 and second information discussed with respect to step 520, but obtained at a different time. For example, additional information may be received at each (or every Nth) transmission opportunity, or according to a periodic rotation-based scanning procedure.

In some embodiments, AP 104*a* may perform the step of updating pattern 122*a* by analyzing the additional information itself. In some embodiments, AP 104*a* may perform the step of updating pattern 122*a* by sending the additional information to be analyzed by another node (e.g., WLC 108) such that AP 104*a* obtains updated pattern 122*a* from the other node. Updated pattern 122*a* may indicate a compatibility between STA 106*a* and each of the plurality of RUs 124 of AP 104*a* over time. Any suitable method may be used to determine compatibility. The node performing the analysis (e.g., AP 104*a* or WLC 108) may use a mean, median, mode, range, maximum, and/or minimum values over a period of time to determine compatibility. In certain embodiments, the analysis may apply some weighting, statistical analysis, or other calibration, for example, to reduce the effect of outlier data or older data on the compatibility determination.

Modifications, additions, or omissions may be made to the method of FIG. 5. The method may include more, fewer, or other steps. Additionally, steps may be performed in any suitable order.

In certain embodiments, the method described with respect to FIG. 5 may be implemented using a computer program comprising executable instructions stored in a non-transitory computer-readable storage medium. The instructions, when executed by processing circuitry, cause the processing circuitry to perform the steps of FIG. 5.

In certain embodiments, the method described with respect to FIG. 5 may be performed by a system comprising memory that stores executable instructions and processing circuitry operable to execute the instructions. In certain embodiments, the system may comprise a controller (e.g., WLC 108) and/or an AP 104. In one embodiment, the controller receives the first and second information from the station (steps 510 and 520) via the AP 104, determines pattern 122 based at least in part on the received first and second information (step 530), and uses pattern 122 to allocate one of the RUs 124 for communications between AP 104 and STA 106. In embodiments where the controller allocates RU 124, the controller may select RU 124 based on pattern 122 and send an instruction to AP 104 to use the selected RU 124 when communicating uplink and/or downlink signals with STA 106.

Certain embodiments of the present disclosure may provide advantages compared to existing frequency hopping and channel hopping techniques. Existing frequency hopping and channel hopping may attempt to avoid unknown multipath fading conditions by hopping among all possible frequencies or channels, thereby avoiding prolonged use of any particular frequency or channel. By contrast, embodiments of the present disclosure may allow for predicting particular RUs that are likely to experience multipath fading based on a recurring pattern of performance.

Certain embodiments of the present disclosure may provide advantages compared to existing 802.11ax/Wi-Fi 6 techniques that rely on a sounding process to provide a snapshot of the state of the channel for a given transmission opportunity. The sounding process in existing 802.11ax/Wi-Fi 6 techniques only provides a general state of the channel, and this sounding process is unable to reliably describe the statistical (over time) effect of multipath on selected RUs. Similarly, channel pilots provide a view on the noise figure of a selected sub-segment of the transmission, but channel pilots provide little information about the general reliability of a particular RU. By contrast, embodiments of the present disclosure estimate RUs and learns over time to avoid some. Certain embodiments of the present disclosure may be implemented in the context of Wi-Fi 6, for example, by leveraging RU functionality in Wi-Fi 6 that comes with orthogonal frequency division multiple access (OFDMA) and adds RU diversity. For example, certain embodiments may rotate the RUs between AP and STA to learn multipath-sensitive ones and avoid them. Certain embodiments may be implemented without requiring changes in the STA behavior because the AP schedules the RUs for the STA in OFDMA. In other embodiments, the AP may transmit a pattern (or a portion of the pattern) to an STA, and the STA may use this information to select which RUs to use to transmit communications to the AP.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An access point configured with a plurality of resource units (RUs), each RU configured to use a frequency range that differs from frequency ranges used by the other RUs, the access point operable to:
   receive first information from a station, the first information indicating, for each RU of the plurality of RUs, a first signal quality that the station associates with a respective RU, wherein the first signal quality that the station associates with the respective RU is affected by the frequency range of the respective RU;
   receive second information from the station, the second information indicating, for each RU of the plurality of RUs, a second signal quality that the station associates with the respective RU, wherein the second signal quality that the station associates with the respective RU is affected by the frequency range of the respective RU;
   determine, based on at least the first information and the second information, a pattern indicating a recurring signal quality that the station associates with each RU of the plurality of RUs; and
   allocate one of the RUs for communicating with the station based at least in part on the pattern.

2. The access point of claim 1, wherein to allocate one of the RUs for communicating with the station based at least in part on the pattern, the access point is further operable to:
   use the pattern to abstain from allocating an RU for which the recurring signal quality falls below a minimum signal quality threshold; or
   use the pattern to abstain from allocating an RU for which the recurring signal quality is poor compared to the recurring signal quality of one or more of the other RUs.

3. The access point of claim 1, wherein the access point is further operable to transmit one or more signals that prompt the station to send the first information via one or more acknowledgement signals or one or more sounding response messages.

4. The access point of claim 1, wherein the first information indicates the first signal quality by providing an indication whether the respective RU successfully received or failed to successfully receive a signal transmitted by the access point.

5. The access point of claim 1, wherein the first information comprises an interference index for each of the plurality of RUs tested by the access point and the pattern indicates which of the plurality of RUs are affected by recurring interference.

6. The access point of claim 1, wherein the pattern indicates a recurring pattern of multi-path fading experienced by the station when located at a given physical location.

7. The access point of claim 1, wherein the first information is received in response to a rotation-based scanning procedure initiated by the access point, wherein the rotation-based scanning procedure prompts the station to provide the first information for each RU of the plurality of RUs.

8. The access point of claim 1, further operable to:
periodically receive additional information from the station, the additional information indicating, for each RU of the plurality of RUs, an additional signal quality that the station associates with the respective RU, wherein the additional signal quality that the station associates with the respective RU is affected by the frequency range of the respective RU; and
update the pattern based on the additional information such that the pattern indicates a compatibility between the station and each RU over time.

9. The access point of claim 1, wherein the access point is operable to allocate the one of the RUs based at least in part on a current channel condition.

10. The access point of claim 9, wherein the access point is further operable to abstain from allocating an RU for which the current channel condition does not indicate an interference problem but for which the pattern indicates a recurring interference problem.

11. A method, comprising:
receiving first information from a station, the first information indicating, for each RU of a plurality of RUs associated with a given access point, a first signal quality that the station associates with a respective RU, wherein each RU corresponds to a frequency range that differs from frequency ranges corresponding to the other RUs, and wherein the first signal quality that the station associates with the respective RU is affected by the frequency range of the respective RU;
receiving second information from the station, the second information indicating, for each RU of the plurality of RUs, a second signal quality that the station associates with the respective RU, wherein the second signal quality that the station associates with the respective RU is affected by the frequency range of the respective RU;
determining, based on at least the first information and the second information, a pattern indicating a recurring signal quality that the station associates with each RU of the plurality of RUs; and
allocating one of the RUs for communications between the access point and the station based at least in part on the pattern.

12. The method of claim 11, wherein allocating one of the RUs for communicating with the station based at least in part on the pattern comprises:
using the pattern to abstain from allocating an RU for which the recurring signal quality falls below a minimum signal quality threshold; or
using the pattern to abstain from allocating an RU for which the recurring signal quality is poor compared to the recurring signal quality of one or more of the other RUs.

13. The method of claim 11, further comprising: transmitting one or more signals that prompt the station to send the first information via one or more acknowledgement signals or one or more sounding response messages.

14. The method of claim 11, wherein the first information indicates the first signal quality by providing an indication whether the respective RU successfully received or failed to successfully receive a signal transmitted by the access point.

15. The method of claim 11, wherein the first information comprises an interference index for each of the plurality of RUs tested using sounding signals and the pattern indicates which of the plurality of RUs are affected by recurring interference.

16. The method of claim 11, wherein the pattern indicates a recurring pattern of multi-path fading experienced by the station when located at a given physical location.

17. The method of claim 11, wherein the first information is received in response to a rotation-based scanning procedure initiated by the access point, wherein the rotation-based scanning procedure prompts the station to provide the first information for each RU of the plurality of RUs.

18. The method of claim 11, further comprising:
periodically receiving additional information from the station, the additional information indicating, for each RU of the plurality of RUs, an additional signal quality that the station associates with the respective RU, wherein the additional signal quality that the station associates with the respective RU is affected by the frequency range of the respective RU; and
updating the pattern based on the additional information such that the pattern indicates a compatibility between the station and each RU over time.

19. A system comprising memory that stores executable instructions and processing circuitry operable to execute the instructions, whereby the system is operable to:
receive first information from a station, the first information indicating, for each RU of a plurality of RUs associated with a given access point, a first signal quality that the station associates with a respective RU, wherein each RU corresponds to a frequency range that differs from frequency ranges corresponding to the other RUs, and wherein the first signal quality that the station associates with the respective RU is affected by the frequency range of the respective RU;
receive second information from the station, the second information indicating, for each RU of the plurality of RUs, a second signal quality that the station associates with the respective RU, wherein the second signal quality that the station associates with the respective RU is affected by the frequency range of the respective RU;
determine, based on at least the first information and the second information, a pattern indicating a recurring signal quality that the station associates with each RU of the plurality of RUs; and
allocate one of the RUs for communications between the access point and the station based at least in part on the pattern.

20. The system of claim 19, wherein the system comprises a controller operable to manage the access point and one or more other access points.

* * * * *